(12) United States Patent
Zhou et al.

(10) Patent No.: US 10,826,727 B1
(45) Date of Patent: Nov. 3, 2020

(54) WIRELESS DEVICE AND METHOD FOR OPERATING WIRELESS DEVICE

(71) Applicant: NXP B.V., Eindhoven (NL)

(72) Inventors: Jun Zhou, Irvine, CA (US); Radha Srinivasan, Irvine, CA (US); Brima Babatunde Ibrahim, Laguna Hills, CA (US)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 16/581,635

(22) Filed: Sep. 24, 2019

(51) Int. Cl.
| H04L 7/04 | (2006.01) |
| H04L 25/02 | (2006.01) |
| H04W 24/10 | (2009.01) |

(52) U.S. Cl.
CPC .......... H04L 25/0212 (2013.01); H04L 7/042 (2013.01); H04L 25/022 (2013.01); H04W 24/10 (2013.01)

(58) Field of Classification Search
CPC .... H04B 1/7073; H04B 1/709; H04B 1/7093; H04L 7/042; H04L 27/2613; H04L 25/0212; H04L 25/022; H04L 27/2602
USPC ................................. 375/262, 316, 341, 343
See application file for complete search history.

(56) References Cited

U.S. PATENT DOCUMENTS

| 5,903,613 A * | 5/1999 | Ishida | ................. G06F 13/4072 370/242 |
| 6,564,268 B1 * | 5/2003 | Davis | ................. G05B 19/0423 379/229 |
| 2003/0058952 A1 * | 3/2003 | Webster | ............. H04L 25/0226 375/260 |
| 2005/0053128 A1 * | 3/2005 | Shearer, III | ....... H04L 25/03159 375/232 |
| 2010/0118835 A1 * | 5/2010 | Lakkis | ................. H04B 7/0695 370/336 |

(Continued)

FOREIGN PATENT DOCUMENTS

WO     2010004055 A2     1/2010

OTHER PUBLICATIONS

Decawave, "DW1000 User manual—How to use, configure and program the DW1000 UWB Transceiver", version 2.05. Available online: https://thetoolchain.com/mirror/dw1000/dw1000_user_manual_v2.05.pdf, 223 pgs. 2015.

*Primary Examiner* — Emmanuel Bayard

(57) ABSTRACT

Embodiments of a method and a device are disclosed. In an embodiment, a method for operating an impulse radio ultra-wideband (IR-UWB) device is disclosed. The method involves acquiring a signal, integrating one or more synchronization symbols in a synchronization field of the signal to determine an initial channel impulse response (CIR) measurement, and detecting whether a start-of-frame delimiter (SFD) field of the signal is identified during integration. When the SFD field of the signal is identified, the method further involves ceasing integration of the one or more synchronization symbols, scaling the initial CIR measurement, and determining a final CIR measurement based on the scaled CIR measurement. When the SFD field is not identified, the method further involves incrementing a counter configured to count the number of the one or more synchronization symbols integrated, and continuing integration of the one or more synchronization symbols until the SFD field is identified.

20 Claims, 7 Drawing Sheets

(56) References Cited

U.S. PATENT DOCUMENTS

| | | | |
|---|---|---|---|
| 2010/0226462 A1* | 9/2010 | Wang | H04L 7/042 375/343 |
| 2011/0116534 A1* | 5/2011 | Seibert | H04L 7/042 375/224 |
| 2012/0069868 A1* | 3/2012 | McLaughlin | H04L 25/0228 375/130 |
| 2013/0163638 A1* | 6/2013 | McLaughlin | H04B 1/7097 375/130 |
| 2015/0016488 A1* | 1/2015 | McLaughlin | H04B 1/719 375/130 |
| 2017/0013507 A1* | 1/2017 | Lee | H04B 5/0031 |
| 2017/0085293 A1* | 3/2017 | Marrow | G01S 3/48 |
| 2018/0227734 A1* | 8/2018 | Lee | H04L 5/0092 |

* cited by examiner

WIRELESS DEVICE AND METHOD FOR OPERATING WIRELESS DEVICE

BACKGROUND

The IEEE 802.15.4a standard specifies an impulse radio ultra-wideband (IR-UWB) physical layer (PHY) protocol. Wireless networks that utilize the IEEE 802.15.4a standard are being implemented for indoor ranging and localization applications. IR-UWB networks employ a train of short radio pulses to estimate channel impulse response. State-of-the-art IR-UWB devices are capable of instant and precise distance measurement, typically to within 10 cm accuracy, even in complicated indoor environments.

The accuracy of a channel response measurement directly depends on a number of synchronization symbols integrated over time. Thus, integrating more synchronization symbols results in a more accurate channel response measurement. Conventional IR-UWB systems typically use a fixed number of integration symbols for a variety of reasons including: (1) predictable signal-to-noise ratio (SNR) scaling on channel response measurement; (2) low complexity on channel response statistics computation; and (3) prevention of symbol integration going beyond a synchronization header (SHR) field. However, channel estimation using a fixed number of synchronization symbols has some disadvantages. For example, a large number of synchronization symbols may be available for channel estimation when synchronization is achieved using only a few synchronization symbols. Thus, using a fixed number of synchronization symbols to measure the channel response may not be optimal if a substantial number of the available synchronization symbols are left unused for the channel estimation.

In another example, a small number of synchronization symbols are used when signal acquisition occurs later within a synchronization period, and thus, a lesser amount of symbols are available for channel response measurement. As such, integrating a fixed number of synchronization symbols can lead to start-of-frame delimiter (SFD) reception failure since synchronization symbol integration may go beyond a SHR field.

SUMMARY

Embodiments of a method and a device are disclosed. In an embodiment, a method for operating a wireless device is disclosed. The method involves acquiring a signal, integrating one or more synchronization symbols in a synchronization field of the signal to determine an initial channel impulse response (CIR) measurement, detecting whether a start-of-frame delimiter (SFD) field of the signal is identified during integration, and when the SFD field of the signal is identified: ceasing integration of the one or more synchronization symbols, scaling the initial CIR measurement, and determining a final CIR measurement based on the scaled CIR measurement.

In an embodiment, the method further involves counting a number of the one or more synchronization symbols integrated.

In an embodiment, when the SFD field is not identified, the method further involves incrementing a counter configured to count the number of the one or more synchronization symbols integrated and continuing integration of the one or more synchronization symbols until the SFD field is identified.

In an embodiment, the scaling involves dividing the initial CIR measurement by the number of the one or more synchronization symbols integrated.

In an embodiment, when the SFD field of the signal is identified, the method further involves correcting a polarity of a SFD sequence in the SFD field and applying the corrected polarity to the initial CIR measurement.

In an embodiment, the acquiring the signal involves receiving the signal, comparing a signal strength value of the signal to a threshold, and determining that the signal is acquired when the signal strength value is greater than the threshold.

In an embodiment, a computer program product including executable instructions encoded in a non-transitory computer readable medium which, when executed by the wireless device, carries out or control the above-described method is disclosed.

In another embodiment, a wireless device is disclosed. The wireless device includes a receive path configured to acquire a signal and processing circuitry. The processing circuitry is configured to integrate one or more synchronization symbols in a synchronization field of the signal to determine an initial channel impulse response (CIR) measurement, detect whether a start-of-frame delimiter (SFD) field of the signal is identified during integration, and when the SFD field of the signal is identified: cease integration of the one or more synchronization symbols, scale the initial CIR measurement, and determine a final CIR measurement based on the scaled CIR measurement.

In an embodiment of the wireless device, the processing circuitry is further configured to count a number of the one or more synchronization symbols integrated.

In an embodiment of the wireless device, when the SFD field is not identified, the processing circuitry is further configured to increment a counter configured to count the number of the one or more synchronization symbols integrated and continue integration of the one or more synchronization symbols until the SFD field is identified.

In an embodiment of the wireless device, the processing circuitry is further configured to divide the initial CIR measurement by the number of the one or more synchronization symbols integrated.

In an embodiment of the wireless device, when the SFD field of the signal is identified, the processing circuitry is further configured to correct a polarity of a SFD sequence in the SFD field and apply the corrected polarity to the initial CIR measurement.

In an embodiment of the wireless device, the processing circuitry is further configured to receive the signal, compare a signal strength value of the signal to a threshold, and determine that the signal is acquired when the signal strength value is greater than the threshold.

In another embodiment, a wireless device is disclosed. The wireless device includes a receive path configured to acquire a signal and processing circuitry. The processing circuitry is configured to integrate one or more synchronization symbols in a synchronization field of the signal, detect whether a start-of-frame delimiter (SFD) field of the signal is identified during integration, and when the SFD field of the signal is identified: cease integration of the one or more synchronization symbols and determine a channel impulse response (CIR) measurement based on a result of the integration.

In an embodiment of the wireless device, the processing circuitry is further configured to scale the result of the integration and determine the CIR measurement based on the scaled result.

In an embodiment of the wireless device, the processing circuitry is further configured to count a number of the one or more synchronization symbols integrated.

In an embodiment of the wireless device, when the SFD field is not identified, the processing circuitry is further configured to increment a counter configured to count the number of the one or more synchronization symbols integrated and continue the integration of the one or more synchronization symbols until the SFD field is identified.

In an embodiment of the wireless device, the processing circuitry is further configured to divide the result of the integration by the number of the one or more synchronization symbols integrated.

In an embodiment of the wireless device, when the SFD field of the signal is identified, the processing circuitry is further configured to correct a polarity of a SFD sequence in the SFD field and apply the corrected polarity to the result of the integration.

In an embodiment of the wireless device, the processing circuitry is further configured to receive the signal, compare a signal strength value of the signal to a threshold, and determine that the signal is acquired when the signal strength value is greater than the threshold.

Other aspects in accordance with the invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

Figure 1:
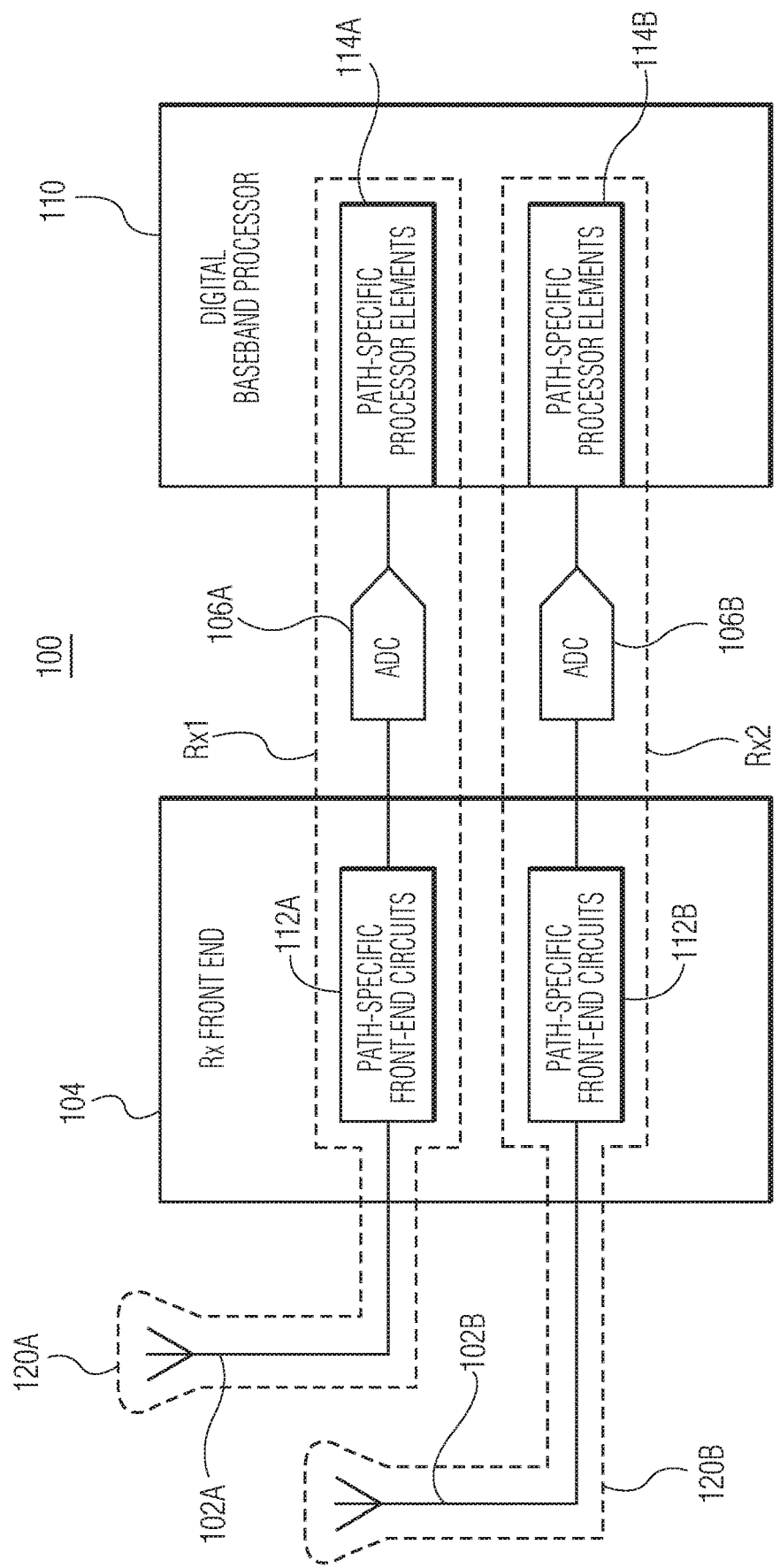
FIG. 1 depicts an example of a wireless RF receiver that includes two antennas, a receiver front-end, two analog-to-digital converters (ADCs), and a digital baseband processor.

FIG. 1 depicts an example of a wireless RF receiver 100 that includes two antennas 102A and 102B, a receiver front-end 104, two analog-to-digital converters (ADCs 106A and 106B), and a digital baseband processor 110. In an embodiment, the receiver front-end includes two path-specific front-end circuits 112A and 112B, with each front-end circuit including, for example, amplifiers, mixers, and filters as is known in the field. The digital baseband processor may include digital circuitry, including path-specific processor elements 114A and 114B, to process digital signals received from the ADCs. In the embodiment of FIG. 1, the receiver includes two receive paths 120A and 120B, a first receive path (Rx1) 120A that includes the first antenna, the first front-end circuit, the first ADC, and the first path-specific processor elements and a second receive path (Rx2) 120B that includes the second antenna, the second front-end circuit, the second ADC, and the second path-specific processor elements. In an embodiment, the wireless RF receiver is an impulse radio ultra-wideband (IR-UWB) receiver that is configured to be compatible with a physical layer (PHY) standard (e.g., the IEEE 802.15.4a standard). In operation, RF energy is received on the antennas and converted to analog signals at the receiver front-end. The analog signals are converted to digital signals by the ADCs and the digital baseband processor processes the digital signals and demodulates the digital signals to provide digital data that is output for further processing. Throughout this specification, embodiments of the wireless RF receiver may be described with respect to the IEEE 802.15.4a standard, however, it is contemplated that such embodiments may also apply to other ultra-wideband (UWB) standards or other communications standards in general.

Although the wireless RF receiver 100 is a multipath receiver that includes two receive paths 120A and 120B, the wireless RF receiver may include one receive path or more than two receive paths. Additionally, in an embodiment, receive paths of the multipath wireless RF receiver may share an antenna such that, for example, the path-specific front-end circuits 112A and 112B of the receiver front-end 104 share the same antenna. Additionally, in an embodiment, the ADCs 106A and 106B may be integrated on the same integrated circuit (IC) device as the digital baseband processor 110.

Figure 2:
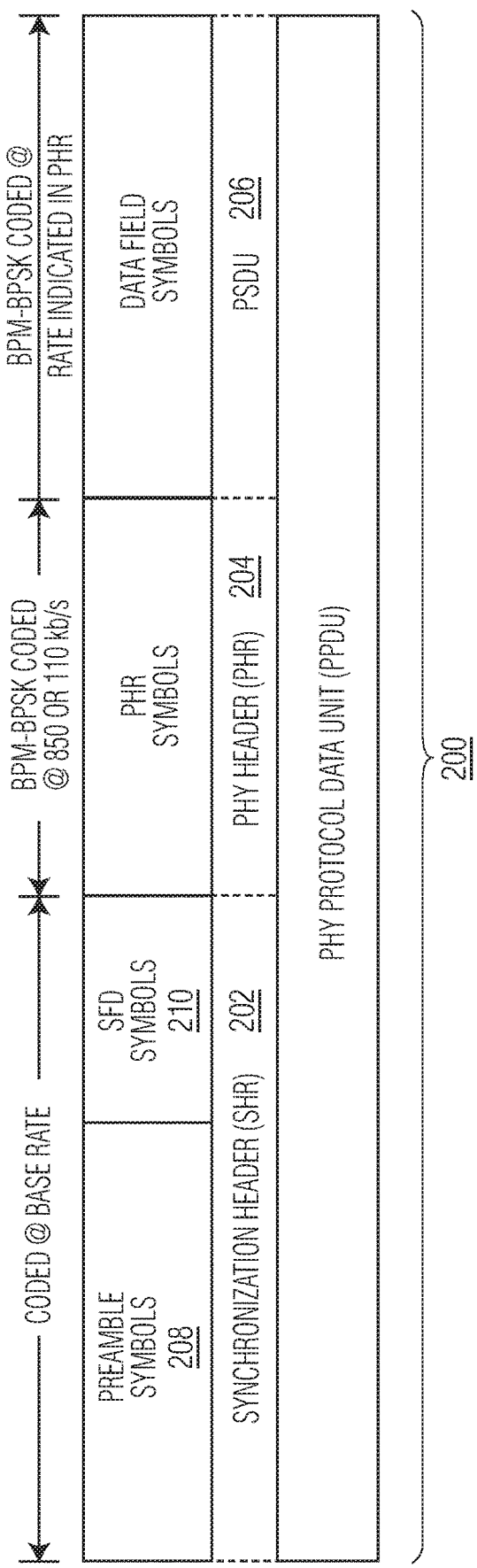
FIG. 2 depicts the format of an ultra-wideband frame.

FIG. 2 depicts the format of an ultra-wideband PHY frame 200. As shown in FIG. 2, the UWB PHY frame (also referred to as a PHY protocol data unit (PPDU)), includes a synchronization header (SHR) 202, a physical layer (PHY) header (PHR) 204, and a physical layer (PHY) service data unit (PSDU) 206. The synchronization header (SHR) 202 is coded at the base rate and includes a preamble (e.g., 16, 64, 1024, or 4096 symbols) 208 and a start-of-frame delimiter (SFD) (e.g., 8 or 64 symbols) 210. The PHY header (PHR) 204 is burst position modulation-binary phase shift keying (BPM-BPSK) coded at 850 or 110 kb/s and may include, e.g., 16 symbols. The PHY service data unit (PSDU) 206 (also known as the data field) is BPM-BPSK coded at the rate indicated in the PHY header (PHR) 204 and may range in size, e.g., from 0 to 1023 symbols.

As is known in the field, the synchronization header (SHR) 202 is used to acquire synchronization. In particular, the preamble 208 is used for frame detection, timing synchronization, and carrier frequency offset recovery, and the SFD carried in the SFD field 210 is used for frame synchronization. The symbols in the preamble 208 and the SFD field 210 may be referred to as synchronization (SYNC) symbols. The PHY header (PHR) 204 is used to convey information used to decode the data in the PHY service data unit (PSDU) 206, including the data rate used to transmit the PSDU, the length of the current frame's preamble, and the length of the packet.

Figure 3:
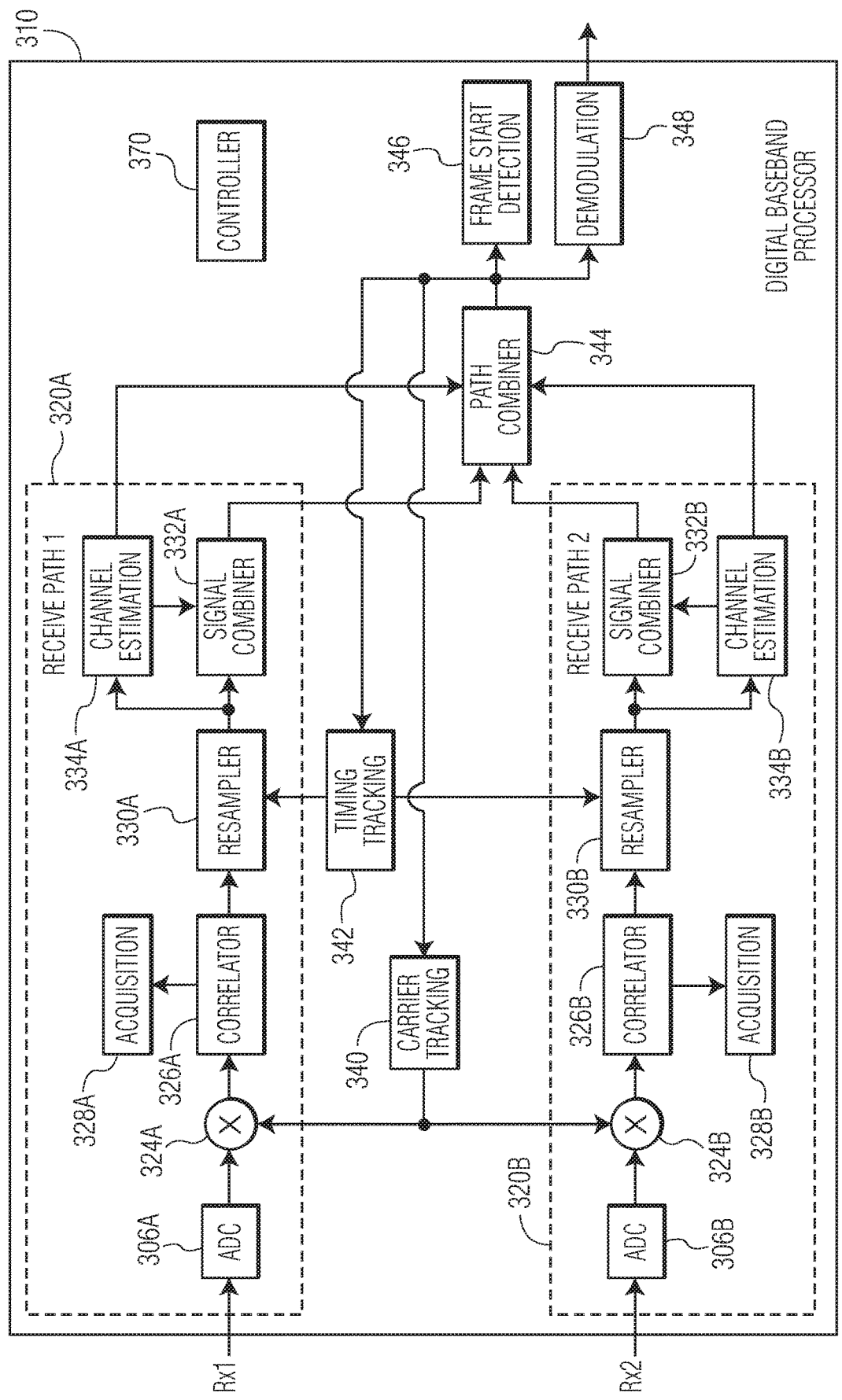
FIG. 3 depicts an example of a functional block diagram of a digital baseband processor of a wireless RF receiver such as the wireless RF receiver depicted in FIG. 1.

FIG. 3 depicts a functional block diagram of a digital baseband processor 310 of a wireless RF receiver such as the wireless RF receiver 100 depicted in FIG. 1. In the embodiment of FIG. 3, the digital baseband processor is an IC device and the ADCs 306A and 306B are incorporated into the same IC device as the digital baseband processor. As depicted in FIG. 3, the digital baseband processor includes two receive paths 320A and 320B, with each receive path including path-specific elements that include an ADC 306A and 306B, a mixer 324A and 324B, a correlator block 326A and 326B, an acquisition block 328A and 328B, a resampler block 330A and 330B, a signal combiner block 332A and 332B, and a channel estimation block 334A and 334B. The digital baseband processor also shares some functional blocks amongst the two receive paths, the shared functional blocks including a carrier tracking block 340, a timing tracking block 342, a path combiner block 344, a frame start detection block 346, and a demodulation block 348. In the embodiment of FIG. 3, the digital baseband processor includes power control circuits that can be used to power up and power down the functional blocks of the digital baseband processor.

Operation of the digital baseband processor 310 is described with reference to FIG. 3. In particular, operation is described with reference to receive path 1 (Rx1) 320A of the digital baseband processor although the description applies also to receive path 2 (Rx2) 320B of the digital baseband processor. Moving generally from left to right, an analog signal from the RF front-end (see FIG. 1) is received at the ADC 306A. The ADC converts the analog signal to a digital signal and the digital signal is provided to the mixer 324A. The mixer mixes the received signal with a frequency offset correction signal to correct for any carrier frequency offset and provides the corrected signal to the correlator block 326A. In an embodiment, the correlator block correlates the received digital data with known preamble symbols to identify correspondence and implements a despreading function as is known in the field. The correlator block provides the correlated information to the acquisition block. The acquisition block 328A is configured to determine whether a signal has been acquired based on the information received from the correlator block. In an embodiment, the acquisition block is configured to compare a signal strength value of the received signal to a programmed signal strength threshold and to assert that a signal has been acquired when the signal strength of the received signal exceeds the signal strength threshold.

The correlator block 326A also passes the received signal through to the resampler block 330A. The resampler block corrects for timing errors that may exist. For example, the resampler block may decrease the sampling rate or increase the sampling rate and/or shift the phase of the sampling rate.

The resampler block 330A provides the resampled digital signal to the signal combiner block 332A and to the channel estimation block 334A. The channel estimation block is configured to determine the magnitude and the time-of-flight (e.g., phase) of each multipath component of the received signal. The signal combiner block is configured to counter the effects of multipath fading and may involve combining signals from multiple correlators, each correlator assigned to a different multipath component. Functions implemented by the signal combiner block and the channel estimation block are known in the field.

The path combiner block 344 receives inputs from the signal combiner block 332A and from the channel estimation block 334A and, in an embodiment, is configured to coherently combine the received signals using a different scale factor. In an embodiment, the path combiner block implements maximal ratio combining (MRC) as is known in the field. The output of the path combiner block is provided to the frame start detection block 346 and to the demodulation block 348. The frame start detection block is configured to detect the symbols that indicate the start of a frame such as the SFD field 210 of the PHY protocol data unit 200 shown in FIG. 2. The demodulation block is configured to extract the original information bearing signal from the modulated signal and to output the original information as digital data. Functions of the frame start detection block and the demodulation block are known in the field.

The carrier tracking block 340 is configured to track the frequency of the carrier signal. In an embodiment, the carrier tracking block compensates for residue in the carrier frequency offset (CFO), which may be a function of the mismatch between the transmission local oscillator (LO) frequency and the receive LO frequency. Functions of the carrier tracking block are known in the field.

The timing tracking block 342 is configured to track the timing (e.g., phase) of the carrier signal. In an embodiment, the timing tracking block determines a sampling frequency offset (SFO) and provides timing correction coefficients to the resampler 330A and 330B. Functions of the timing tracking block are known in the field.

In an embodiment, the functions of the digital baseband processor 310 are categorized into three function-based categories, including an acquisition function, a channel estimation function, and a tracking and demodulation function.

In an embodiment, the acquisition function involves determining that a signal formatted according to the PHY protocol has been detected. For example, the acquisition function involves determining that an UWB signal (e.g., in the form of a frame formatted according to the IEEE 802.15.4a) is being received at the IR-UWB device. In an embodiment, the acquisition function is implemented via the ADCs 306A and 306B, the correlator blocks 326A and 326B, and the acquisition blocks 328A and 328B. It should be noted that the mixers 324A 324B can be operated such that the mixers do not change the incoming signal, effectively "bypassing" the mixers 324A and 324B. As such, in an embodiment, the acquisition function does not rely on operations from the mixers 324A and 324B, the resampler blocks 330A and 330B, the signal combiner blocks 332A and 332B, the channel estimation blocks 334A and 334B, the carrier tracking block 340, the timing tracking block 342, the path combiner block 344, the frame start detection block 346, and the demodulation block 348.

In an embodiment, the channel estimation function involves estimating channel characteristics so that filter coefficients can be generated for received signals. In an embodiment, the channel estimation function is implemented via the ADCs 306A and 306B, the mixers 324A and 324B, the correlator blocks 326A and 326B, the resampler blocks 330A and 330B, the signal combiner blocks 332A and 332B, the channel estimation blocks 334A and 334B, the carrier tracking block 340, the timing tracking block 342, and in some instances the path combiner block 344. As such, in an embodiment, the channel estimation function does not involve operations from the acquisition blocks 328A and 328B, the frame start detection block 346, and the demodulation block 348.

In an embodiment, the tracking and demodulation function involves carrier and timing tracking (e.g., determining frequency/timing offsets) and demodulating the received signals to extract the original information-bearing signal from a carrier signal. The tracking and demodulation function is implemented by the ADCs 306A and 306B, the mixers 324A and 324B, the correlator blocks 326A and 326B, the resampler blocks 330A and 330B, the signal combiner blocks 332A and 332B, the carrier tracking block 340, the timing tracking block 342, the path combiner block 344, the frame start detection block 346, and the demodulation block 348. As such, in an embodiment, the tracking and demodulation function does not involve operations from the acquisition blocks 328A and 328B and the channel estimation blocks 334A and 334B.

In an embodiment, the functional blocks, including the ADCs 306A and 306B, the mixers 324A and 324B, the correlator blocks 326A and 326B, the acquisition blocks 328A and 328B, the resampler blocks 330A and 330B, the signal combiner blocks 332A and 332B, the channel estimation blocks 334A and 334B, the carrier tracking block 340, the timing tracking block 342, the path combiner block 344, the frame start detection block 346, and the demodulation block 348 are implemented in the digital baseband processor 310 via electrical circuits, such as an application-specific integrated circuit (ASIC) and/or in a microprocessor circuit, such as a microcontroller IC device, that executes computer readable instructions. In an embodiment, the functional blocks are implemented in an IC device in a combination of hardware, software, and/or firmware.

In one embodiment, as described herein, a synchronization symbols integration scheme is compatible with wireless devices (e.g., IR-UWB devices) to optimize the number of synchronization symbols used in channel estimation. The scheme disclosed herein may improve the signal-to-noise ratio (SNR) of channel measurements and can avoid the late termination of synchronization symbol integration beyond the SHR field. In one or more embodiments, the scheme enables self-awareness of a SHR field symbol boundary and automatic termination of synchronization symbol integration. For example, the disclosed scheme automatically terminates (terminates as a matter of routine) synchronization symbol integration upon detection of a start-of-frame delimiter (SFD) field in a received signal. Features of the scheme may include: 1) eliminating a hard threshold on the number of synchronization symbols to integrate during channel estimation; 2) utilizing a start-of-frame delimiter (SFD) field (part of a synchronization header (SHR) field) to terminate symbol integration automatically, and therefore, promote integration termination at the SHR field symbol boundary; and 3) maximizing a length of synchronization symbol integration to realize an optimal SNR on channel measurement.

The format of a SHR field in an IR-UWB system is shown in FIG. 2 (see SHR field 202). Hereinafter, the preamble 208 within the SHR field 202 may be referred to as a synchronization (SYNC) field 208. The SYNC field 208 may be used to obtain frequency and timing synchronization between IR-UWB devices. In an embodiment, a number of available SYNC symbols in the SYNC field 208 may depend on a rate at which the PSDU 206 is coded. For example, the number of available SYNC symbols in the SYNC field 208 may be 64 symbols when the PSDU 206 is coded at a rate of 6.8 Mbps. In another example, the number of available SYNC symbols in the SYNC field 208 may be 1024 symbols when the PSDU 206 is coded at a rate of 850 Kbps. In an embodiment, a quarter of the total number of SYNC symbols in the SYNC field 208 may be used for channel estimation. Accordingly, by knowing the rate at which the PSDU 206 is coded, the total number of SYNC symbols in the SYNC field 208 may be determined, and further, the number of SYNC symbols used for channel estimation may also be determined. As such, the SNR of channel estimation may be balanced against the possibility of late symbol integration termination at the PHR field 204.

Figure 4:
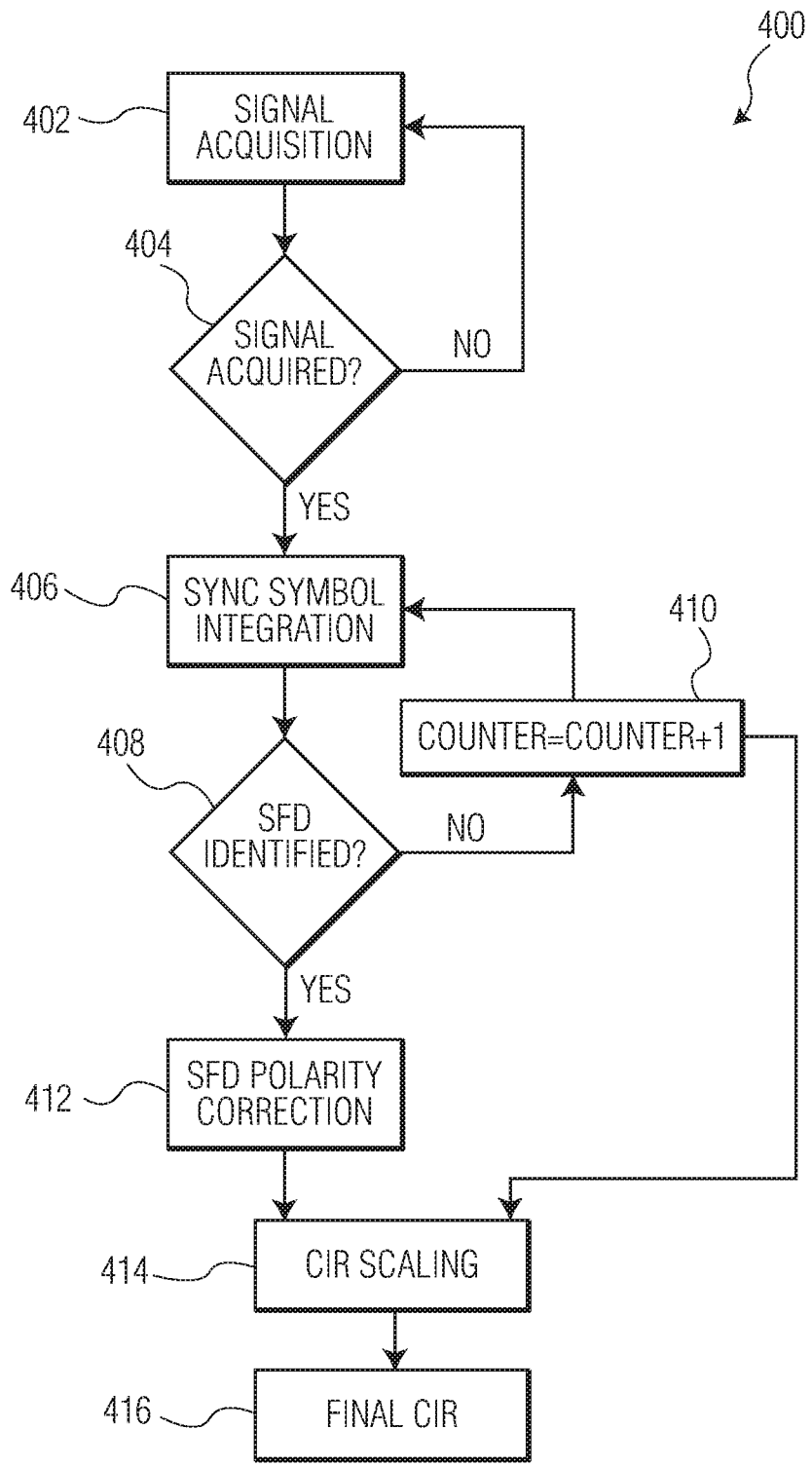
FIG. 4 is a process flow diagram of a method for synchronization symbols integration for use in an IR-UWB device in accordance with an embodiment of the present disclosure.

FIG. 4 is a process flow diagram of a method for synchronization symbols integration for use in a wireless device (e.g., IR-UWB device) in accordance with an embodiment of the invention. At decision point 402, the method involves performing a signal acquisition process to determine whether a signal has been acquired. In an embodiment, the wireless device (e.g., acquisition block 328A or 328B) receives a signal and compares a signal strength value of the received signal to a programmed signal strength threshold. The IR-UWB device may determine that a signal has been acquired when the signal strength of the received signal exceeds the signal strength threshold.

At decision point 404, the method involves determining (e.g., via acquisition block 328A or 328B) whether the signal has been acquired. At decision point 406, upon determining that the signal has been acquired, the method involves integrating SYNC symbols (e.g., via channel estimation block 334A or 334B) included in a SYNC field (e.g., SYNC field 208 of SHR 202) of the acquired signal to measure a channel impulse response (CIR).

In an embodiment, a counter (e.g., within channel estimation block 334A or 334B) runs in parallel to the SYNC symbol integration to count/register the number of SYNC symbols integrated. Moreover, the SYNC symbol integration process may run continuously until a start-of-frame delimiter (SFD) field (e.g., SFD field 210 of SHR 202) of the acquired signal is identified. As such, during SYNC symbol integration, at decision point 408, the method involves determining (e.g., via frame start detection block 346) whether the SFD field is identified.

If the SFD field is not identified, at decision point 410, the method involves incrementing the counter to update the count of the number of SYNC symbols integrated and continuing the SYNC symbol integration (decision point 406). However, if the SFD field is identified, at decision point 412, the method involves ceasing the SYNC symbol integration and correcting (e.g., via frame start detection block 346 and/or channel estimation block 334A or 334B) a polarity of a SFD sequence in the SFD field. The corrected polarity of the SFD sequence may be applied on a result of the SYNC symbol integration. In an embodiment, the polarity correction compensates for a polarity mismatch for an optimal SNR in CIR measurement.

At decision point 414, the method involves scaling the CIR measurement (e.g., via channel estimation block 334A or 334B). For example, the CIR measurement is scaled by (divided by) the number of integrated SYNC symbols counted/registered at the counter (decision point 410), which may include a number of symbols in the SFD field. At decision point 416, the method involves determining a final CIR measurement based on the scaled CIR measurement (e.g., via channel estimation block 334A or 334B). Thus, by implementing the method, a number of synchronization symbols used in channel estimation is not fixed, and therefore, a signal-to-noise ratio (SNR) of channel measurements is improved since the number of used synchronization symbols is optimized. The method also provides for automatic synchronization symbols integration since the SYNC symbol integration will automatically terminate (terminates as a matter of routine) upon the SFD field being identified. Such identification of the SFD field and consequent termination of the SYNC symbol integration avoids having the integration terminate beyond a SHR field (e.g., within a PHR field) such as when a fixed number of synchronization symbols are used for CIR measurement, and therefore, SFD reception failure is also avoided.

Figure 5:
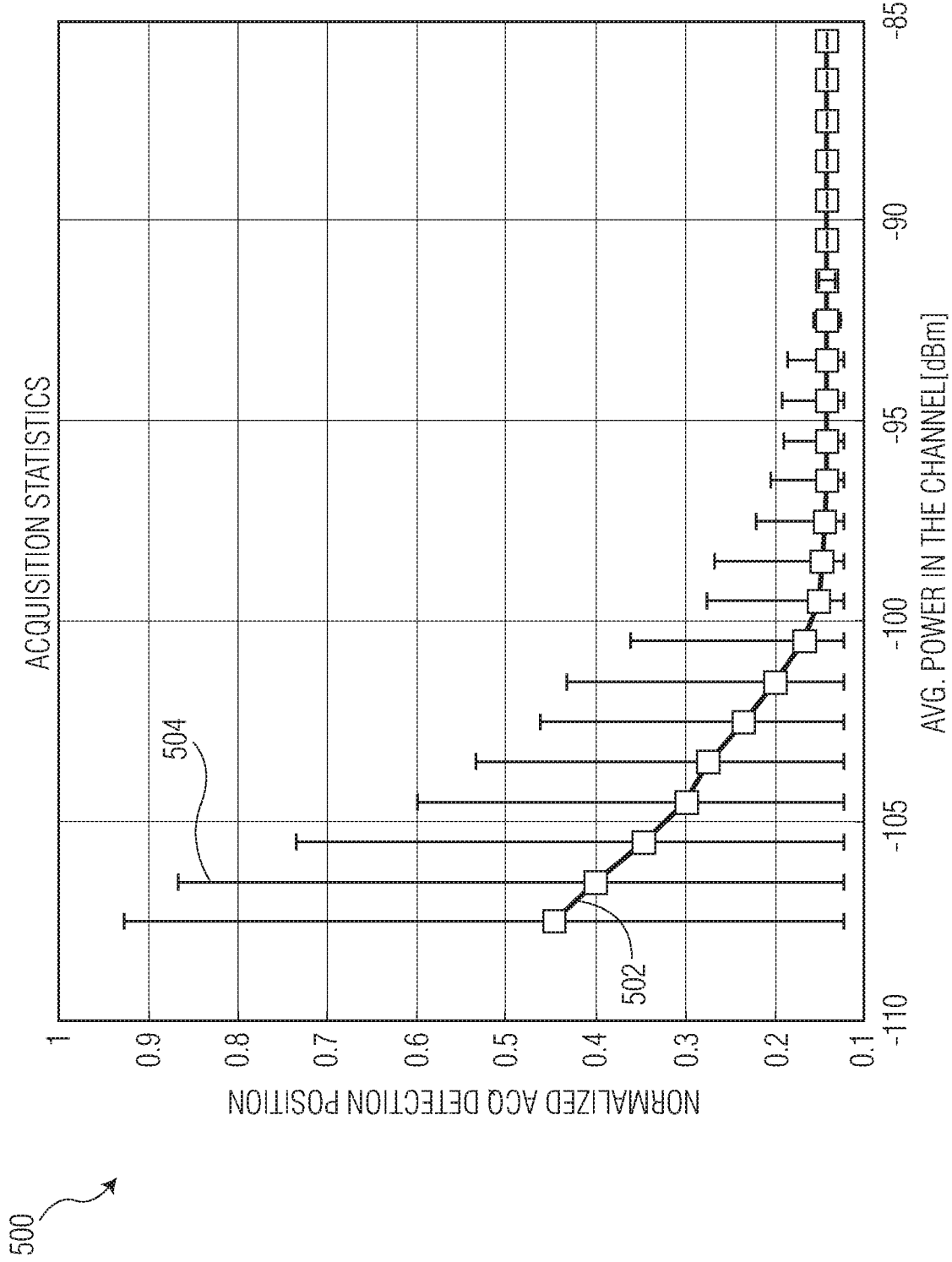
FIG. 5 is a graph of normalized signal acquisition (ACQ) detection position versus average power in a channel.

FIG. 5 is a graph 500 of normalized signal acquisition (ACQ) detection position versus average power in a channel. In particular, the graph 500 illustrates an example simulation result of a signal acquisition position relative to a normalized length of a SYNC field at an IR-UWB 6.8 Mbps data rate mode. A plot line 502 indicates an average signal acquisition position in a SYNC field. A vertical bar (e.g., vertical bar 504) indicates three times a standard deviation of the signal acquisition position, which serves as an upper bound of a late signal acquisition (upper bound of SYNC symbols in the SYNC field).

According to the graph 500, a fixed number of SYNC symbols, e.g., one quarter (¼ or 0.25) of all available SYNC symbols in a SYNC field, is not optimal for measuring a channel impulse response (CIR) because signal detection requires less than three quarters (less than ¾ or 0.75) of all available SYNC symbols at certain received signal powers. For example, when a received signal power is less than −105 dBm, a substantial number of available SYNC symbols are left unused for CIR measurement. Referring to a second vertical bar 504 (located approximately at −106.5 dBm), if signal detection occurs at a SYNC field position of 0.4 and an upper bound of SYNC symbols in the SYNC field is approximately 0.88, then the percentage of all available SYNC symbols used for signal detection is approximately 0.4/0.88=0.45 (which is less than ¾ or 0.75 of all available SYNC symbols), and thus, a substantial percentage of available SYNC symbols (approximately 0.75−0.45=0.30) are left unused for CIR measurement. Therefore, CIR measurement can be improved by automatically controlling the number of integrated SYNC symbols.

Figure 6:
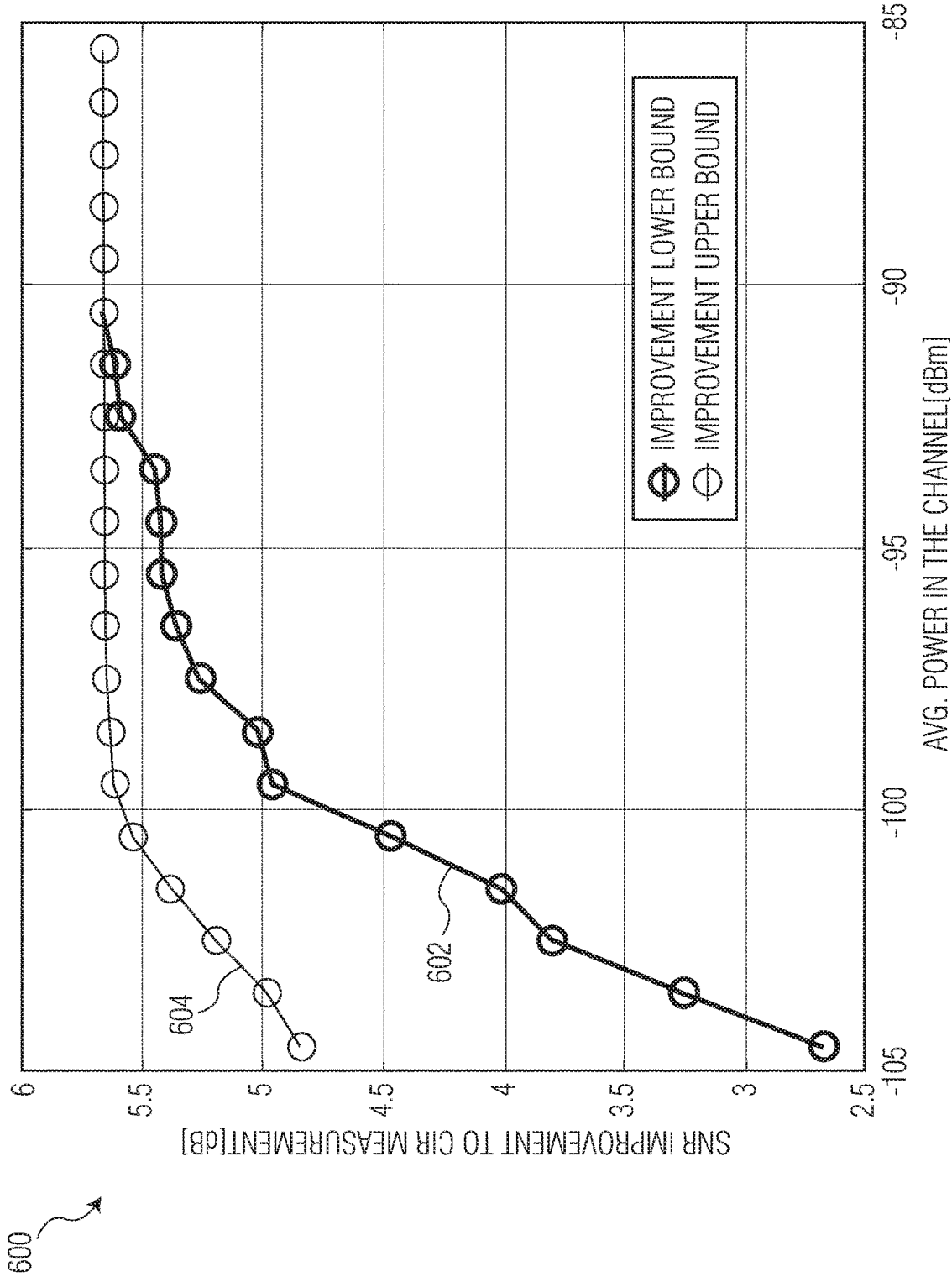
FIG. 6 is a graph of signal-to-noise ratio (SNR) improvement to channel impulse response (CIR) measurement versus average power in a channel when implementing an automatic synchronization symbols integration scheme of the present disclosure.

FIG. 6 is a graph 600 of signal-to-noise ratio (SNR) improvement to channel impulse response (CIR) measurement versus average power in a channel when implementing the synchronization symbols integration scheme of the present disclosure. In particular, the graph 600 illustrates the SNR improvement to CIR measurement at an IR-UWB 6.8 Mbps data rate mode. A first plot line 602 shows a lower bound of the SNR improvement on CIR measurement. A second plot line 604 shows an upper bound of the SNR improvement on CIR measurement.

In an embodiment, the synchronization symbols integration scheme of the present disclosure realizes an SNR improvement of 5.6 dB at a relatively high signal power, e.g., −90 dBm average channel power. At a relatively low signal power, e.g., −99 dBm average channel power, the SNR improvement is above 5 dB. Notably, an IR-UWB system may employ a different number of SYNC symbols for different data rates. As such, the synchronization symbols integration scheme of the present disclosure may be applied to other data rate modes, e.g., 27 Mbps, 850 Kbps, and 110 Kbps data rate modes.

In an embodiment, ultra-wideband or "UWB" refers to frequency ranges that correspond to the IEEE 802.15.4a standard, including the 250 to 750 MHz band, the 3,244 to 4,742 MHz band, and the 5,944 to 10,234 MHz band, although other bands are possible. Additionally, ultra-wideband or "UWB" may refer to a frequency range of 3.1 to 10.6 GHz. Embodiments in this specification may be implemented in UWB devices or other wireless devices as defined by other wireless communications standards.

Figure 7:
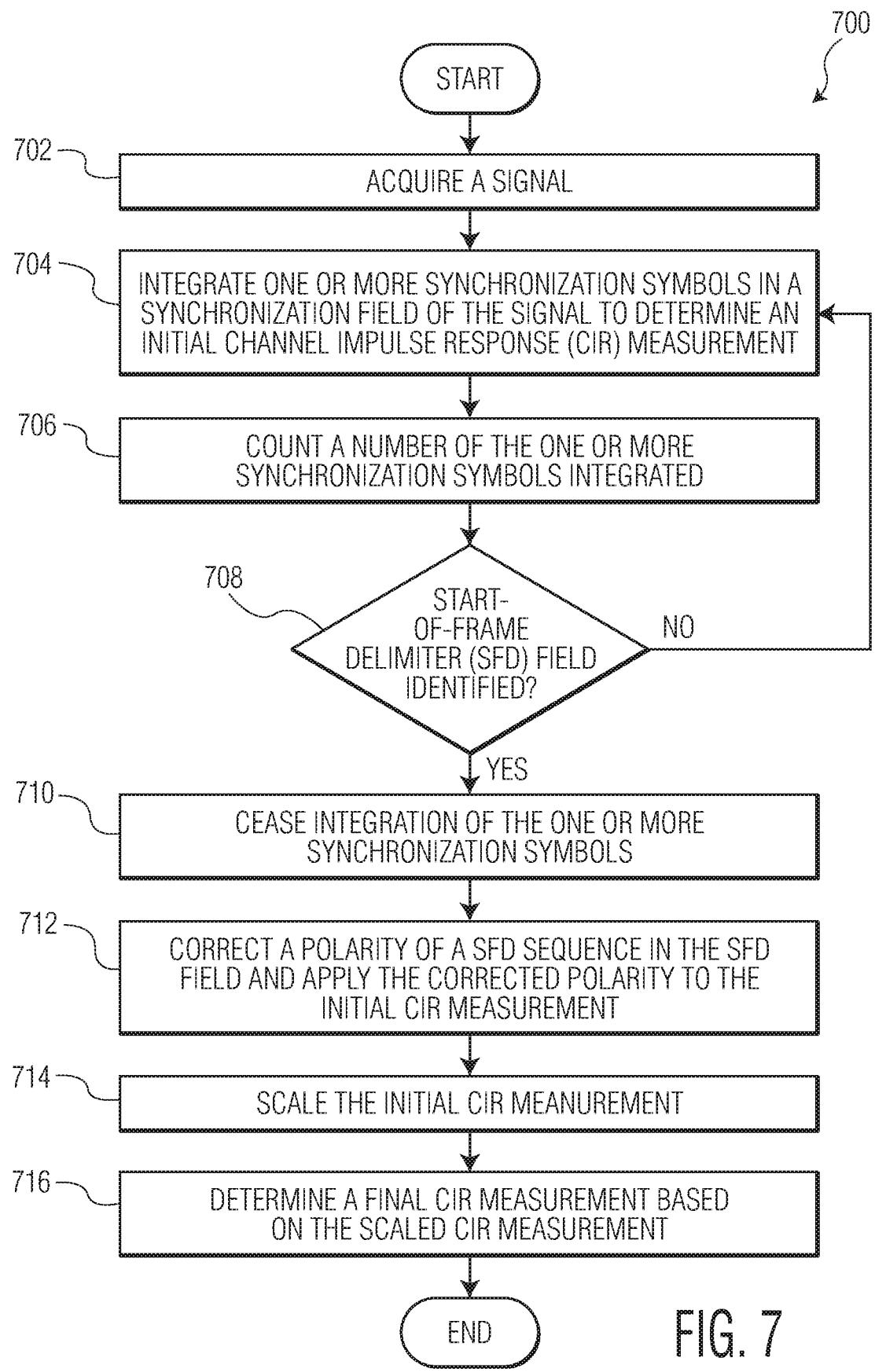
FIG. 7 is a process flow diagram of a method for operating an impulse radio ultra-wideband (IR-UWB) device in accordance with an embodiment of the present disclosure.

FIG. 7 is a process flow diagram 700 of a method for operating a wireless device (e.g., an impulse radio ultra-wideband (IR-UWB) device) in accordance with an embodiment of the present disclosure. At decision point 702, the method involves acquiring a signal (e.g., via acquisition block 328A or 328B). For example, acquisition of the signal is performed by receiving the signal, comparing a signal strength value of the signal to a threshold, and determining that the signal is acquired when the signal strength value is greater than the threshold.

At decision point 704, the method involves integrating one or more synchronization symbols in a synchronization field (e.g., SYNC field 208) of the signal to determine an initial channel impulse response (CIR) measurement (e.g., via channel estimation block 334A or 334B). At decision point 706, the method involves counting a number of the one or more synchronization symbols integrated (e.g., via channel estimation block 334A or 334B).

At decision point 708, the method involves detecting whether a start-of-frame delimiter (SFD) field (e.g., SFD field 210) of the signal is identified during integration (e.g., via frame start detection block 346). When the SFD field is not identified, in an embodiment, the method involves incrementing a counter (e.g., within channel estimation block 334A or 334B) configured to count the number of the one or more synchronization symbols integrated (decision point 704) and continuing integration of the one or more synchronization symbols (decision point 706) until the SFD field is identified.

When the SFD field of the signal is identified, at decision point 710, the method involves ceasing integration of the one or more synchronization symbols. Thereafter, at decision point 712, the method involves correcting a polarity of a SFD sequence in the SFD field and applying the corrected polarity to the initial CIR measurement (e.g., via frame start detection block 346 and/or channel estimation block 334A or 334B). Moreover, at decision point 714, the method involves scaling the initial CIR measurement (e.g., via channel estimation block 334A or 334B). For example, scaling is performed by dividing the initial CIR measurement by the number of the one or more synchronization symbols integrated. At decision point 716, the method involves determining a final CIR measurement based on the scaled CIR measurement (e.g., via channel estimation block 334A or 334B). Here, the final CIR measurement is the last or definitive CIR measurement ascertained after the SFD field of the signal is identified and the integration of the one or more synchronization signals has ceased.

The above-described operations improve a signal-to-noise ratio (SNR) of channel measurements at a wireless device by allowing a non-fixed number of synchronization symbols to be integrated for channel estimation until an SFD field is identified. Because the number of synchronization symbols used is not fixed, the operations facilitate the integration of an optimal number of synchronization symbols to improve CIR measurement. The above-described operations also provide for automatic synchronization symbols integration since the SYNC symbol integration will automatically terminate (terminates as a matter of routine) upon the SFD field being identified. Such identification of the SFD field and consequent termination of the SYNC symbol integration avoids having the integration terminate beyond a SHR field (e.g., within a PHR field) such as when a fixed number of synchronization symbols are used for CIR measurement, and therefore, SFD reception failure is also avoided.

In an embodiment, the method is implemented in a wireless RF receiver that includes a digital baseband processor as described above with reference to FIGS. 1 to 3. For example, the digital baseband processor 110, 310 includes processor and memory circuits configured to store and execute computer readable instructions that implement the methods described herein. In an embodiment, the digital baseband processor includes a controller (e.g., controller 370) configured to coordinate the automatic synchronization symbols integration functions as described herein.

The above-described operations for operating a wireless device (e.g., an IR-UWB device) can be implemented in hardware, firmware, or a combination thereof, or implemented in a combination of hardware and software, or implemented in a combination of firmware and software, or implemented in a combination of hardware, firmware, and software.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods described herein may be implemented using software instructions stored on a computer useable storage medium (e.g., memory circuits) for execution by the digital baseband processor. As an example, an embodiment of a computer program product includes a computer useable storage medium to store a computer readable program.

The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Alternatively, embodiments of the invention may be implemented entirely in hardware or in an implementation containing both hardware and software elements. In embodiments which use software, the software may include but is not limited to firmware, resident software, microcode, etc.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for operating a wireless device, the method comprising:
    acquiring a signal;
    integrating one or more synchronization symbols in a synchronization field and start-of-frame delimiter (SFD) field of the signal to determine an initial channel impulse response (CIR) measurement;
    detecting whether the SFD field of the signal is identified during integration; and
    when the SFD field of the signal is identified:
        ceasing integration of the one or more synchronization symbols,
        modifying the initial CIR measurement based on an SFD sequence in the SFD field to form a modified initial CIR measurement;
        scaling the modified initial CIR measurement, and
        determining a final CIR measurement based on the scaled CIR measurement.

2. The method of claim 1, further comprising counting a number of the one or more synchronization symbols integrated.

3. The method of claim 2, wherein when the SFD field is not identified, the method further comprising:
    incrementing a counter configured to count the number of the one or more synchronization symbols integrated; and
    continuing integration of the one or more synchronization symbols until the SFD field is identified.

4. The method of claim 2, wherein the scaling comprises dividing the modified initial CIR measurement by the number of the one or more synchronization symbols integrated.

5. The method of claim 1, wherein when the SFD field of the signal is identified, the method further comprising:
    correcting a polarity of flail the SFD sequence in the SFD field; and
    wherein modifying the initial CIR measurement comprises applying the corrected polarity to the initial CIR measurement.

6. The method of claim 1, wherein the acquiring the signal comprises:
    receiving the signal;

comparing a signal strength value of the signal to a threshold; and
determining that the signal is acquired when the signal strength value is greater than the threshold.

7. A computer program product comprising executable instructions encoded in a non-transitory computer readable medium which, when executed by a wireless device, cause the device to acquire a signal, integrate one or more synchronization symbols and start-of-frame delimiter (SFD) field in a synchronization field of the signal to determine an initial channel impulse response (CIR) measurement, and detect whether the SFD field of the signal is identified during integration, wherein when the SFD field of the signal is identified, the instructions further cause the device to cease integration of the one or more synchronization symbols, modify the initial CIR measurement based on an SFD sequence in the SFD field to form a modified initial CIR measurement; scale the modified initial CIR measurement, and determine a final CIR measurement based on the scaled CIR measurement.

8. A wireless device, comprising:
a receive path configured to acquire a signal; and
processing circuitry configured to integrate one or more synchronization symbols and start-of-frame delimiter (SFD) field in a synchronization field of the signal to determine an initial channel impulse response (CIR) measurement and detect whether the SFD field of the signal is identified during integration, wherein when the SFD field of the signal is identified, the processing circuitry is further configured to cease integration of the one or more synchronization symbols, modify the initial CIR measurement based on an SFD sequence in the SFD field to form a modified initial CIR measurement, scale the modified initial CIR measurement, and determine a final CIR measurement based on the scaled CIR measurement.

9. The wireless device of claim 8, wherein the processing circuitry is further configured to count a number of the one or more synchronization symbols integrated.

10. The wireless device of claim 9, wherein when the SFD field is not identified, the processing circuitry is further configured to:
increment a counter configured to count the number of the one or more synchronization symbols integrated; and
continue integration of the one or more synchronization symbols until the SFD field is identified.

11. The wireless device of claim 9, wherein the processing circuitry is further configured to divide the modified initial CIR measurement by the number of the one or more synchronization symbols integrated.

12. The wireless device of claim 8, wherein when the SFD field of the signal is identified, the processing circuitry is further configured to:
correct a polarity of the SFD sequence in the SFD field; and
wherein modifying the initial CIR measurement comprises applying the corrected polarity to the initial CIR measurement.

13. The wireless device of claim 8, wherein the processing circuitry is further configured to:
receive the signal;
compare a signal strength value of the signal to a threshold; and
determine that the signal is acquired when the signal strength value is greater than the threshold.

14. A wireless device, comprising:
a receive path configured to acquire a signal; and
processing circuitry configured to integrate one or more synchronization symbols and start-of-frame delimiter (SFD) field in a synchronization field of the signal to determine an initial channel impulse response (CIR) measurement and detect whether flail the SFD field of the signal is identified during integration, wherein when the SFD field of the signal is identified, the processing circuitry is further configured to cease integration of the one or more synchronization symbols modify the initial CIR measurement based on an SFD sequence in the SFD field to form a modified initial CIR measurement, and determine a final channel impulse response (CIR) measurement based on flail the modified initial CIR measurement.

15. The wireless device of claim 14, wherein the processing circuitry is further configured to:
scale the result of the integration; and
determine the CIR measurement based on the scaled result.

16. The wireless device of claim 14, wherein the processing circuitry is further configured to count a number of the one or more synchronization symbols integrated.

17. The wireless device of claim 16, wherein when the SFD field is not identified, the processing circuitry is further configured to:
increment a counter configured to count the number of the one or more synchronization symbols integrated; and
continue the integration of the one or more synchronization symbols until the SFD field is identified.

18. The wireless device of claim 16, wherein the processing circuitry is further configured to divide the result of the integration by the number of the one or more synchronization symbols integrated.

19. The wireless device of claim 14, wherein when the SFD field of the signal is identified, the processing circuitry is further configured to:
correct a polarity of the SFD sequence in the SFD field; and
wherein modifying the initial CIR measurement comprises applying the corrected polarity to the result of the integration.

20. The wireless device of claim 14, wherein the processing circuitry is further configured to:
receive the signal;
compare a signal strength value of the signal to a threshold; and
determine that the signal is acquired when the signal strength value is greater than the threshold.

* * * * *